(12) United States Patent
Jin et al.

(10) Patent No.: US 10,673,612 B2
(45) Date of Patent: Jun. 2, 2020

(54) METHOD OF SEARCHABLE PUBLIC-KEY ENCRYPTION AND SYSTEM AND SERVER USING THE SAME

(71) Applicant: Huazhong University of Science and Technology, Wuhan, Hubei (CN)

(72) Inventors: Hai Jin, Hubei (CN); Peng Xu, Hubei (CN); Shuanghong He, Hubei (CN); Deqing Zou, Hubei (CN)

(73) Assignee: Huazhong University of Science and Technology, Wuhan (CN)

( * ) Notice: Subject to any disclaimer, the term of this patent is extended or adjusted under 35 U.S.C. 154(b) by 120 days.

(21) Appl. No.: 16/169,377

(22) Filed: Oct. 24, 2018

(65) Prior Publication Data
US 2019/0207763 A1  Jul. 4, 2019

(30) Foreign Application Priority Data
Dec. 29, 2017  (CN) .......................... 2017 1 1497700

(51) Int. Cl.
| | |
|---|---|
| H04L 9/00 | (2006.01) |
| H04L 9/30 | (2006.01) |
| H04L 9/06 | (2006.01) |
| G06F 16/33 | (2019.01) |
| H04L 9/08 | (2006.01) |
| G06F 21/62 | (2013.01) |

(52) U.S. Cl.
CPC .......... *H04L 9/006* (2013.01); *G06F 16/3331* (2019.01); *G06F 21/6227* (2013.01); *H04L 9/0618* (2013.01); *H04L 9/0643* (2013.01); *H04L 9/083* (2013.01); *H04L 9/3006* (2013.01); *H04L 9/3073* (2013.01)

(58) Field of Classification Search
CPC ....................................................... H04L 9/006
See application file for complete search history.

(56) References Cited

U.S. PATENT DOCUMENTS

| | | | | |
|---|---|---|---|---|
| 5,987,133 A | * | 11/1999 | Aisaka | H04L 9/3249 380/30 |
| 6,134,431 A | * | 10/2000 | Matsumoto | H04W 84/16 380/247 |
| 6,584,563 B1 | * | 6/2003 | Kikuchi | H04L 9/0894 380/285 |
| 7,983,986 B1 | * | 7/2011 | Carragher | G06Q 20/10 705/35 |
| 8,078,491 B1 | * | 12/2011 | Carragher | G06Q 20/04 705/14.1 |
| 9,436,835 B1 | | 9/2016 | Saldamil | |
| 2002/0004902 A1 | * | 1/2002 | Toh | H04L 63/0442 713/170 |
| 2002/0013940 A1 | * | 1/2002 | Tsukamoto | H04N 21/42669 725/5 |
| 2002/0051544 A1 | * | 5/2002 | Kikuchi | H04L 9/0894 380/277 |

(Continued)

FOREIGN PATENT DOCUMENTS

| | | |
|---|---|---|
| CN | 103023637 | 4/2013 |
| CN | 104468121 | 3/2015 |
| CN | 107086917 | 8/2017 |

*Primary Examiner* — Bradley W Holder
(74) *Attorney, Agent, or Firm* — Michael X. Ye; Morris, Manning & Martin, LLP (57) ABSTRACT

The present invention involves with a method of searchable public-key encryption, a system and server using the method.

13 Claims, 4 Drawing Sheets

(56) References Cited

U.S. PATENT DOCUMENTS

| | | | |
|---|---|---|---|
| 2002/0150243 A1* | 10/2002 | Craft | H04L 63/0823 380/201 |
| 2004/0250082 A1* | 12/2004 | Li | H04L 9/3247 713/181 |
| 2005/0015471 A1* | 1/2005 | Zhang | H04L 63/0442 709/221 |
| 2005/0120203 A1* | 6/2005 | Yeh | H04L 9/0891 713/156 |
| 2006/0161774 A1* | 7/2006 | Huh | G06F 21/445 713/168 |
| 2006/0168447 A1* | 7/2006 | Pailles | G06Q 20/363 713/176 |
| 2008/0118070 A1* | 5/2008 | Yeap | H04L 63/0823 380/282 |
| 2009/0037728 A1* | 2/2009 | Kamikura | H04L 9/3263 713/156 |
| 2009/0198997 A1* | 8/2009 | Yeap | H04L 51/28 713/155 |
| 2010/0211781 A1* | 8/2010 | Auradkar | H04L 9/0866 713/168 |
| 2010/0318782 A1* | 12/2010 | Auradkar | H04L 9/0891 713/150 |
| 2011/0145580 A1* | 6/2011 | Auradkar | H04L 67/1097 713/170 |
| 2011/0145594 A1* | 6/2011 | Jho | G06F 21/602 713/189 |
| 2012/0324240 A1* | 12/2012 | Hattori | H04L 9/3073 713/189 |
| 2015/0156025 A1* | 6/2015 | Zhu | H04L 67/42 713/156 |

* cited by examiner

METHOD OF SEARCHABLE PUBLIC-KEY ENCRYPTION AND SYSTEM AND SERVER USING THE SAME

FIELD

The present invention relates to cryptography and cloud storage security, and more particularly to a method of searchable public-key encryption, and a system and a server using the same.

BACKGROUND

With the rapid development of cloud computing, in order to save local storage resources as well as facilitate multisite access, more and more users choose to have their own data stored in cloud servers. For protecting data security, these users usually encrypt their private data before uploading them. According to the conventional encryption technologies, only a key holder can decrypt a ciphertext. Therefore, when users try to search cloud-saved outsourced data using a keyword, they must download the whole ciphertext before decrypting the ciphertext and performing the search locally. This obviously leads to huge network resource costs, local computation costs and storage costs. In order to assure security of cloud storage and provide safe and efficient data access at the same time, searchable encryption has been introduced. Due to the innate limitation of symmetric encryption, when applied in multi-user scenarios, searchable symmetric encryption usually requires a secure channel for transmission of secret information. For realizing safe communication and search in public networks, searchable public key encryption with keyword search (PEKS) has been proposed as a solution and extensively researched.

A typical PEKS application comprises plural transmitting parties, a server, and a receiving party. Any of the transmitting parties can use a public key of the receiving party to generate a searchable ciphertext for the keyword, and then send it to the server. The receiving party can use its own private key to generate a search trapdoor for the keyword, and send it to the server. After the server receives the search trapdoor, it can correctly find out all the ciphertexts containing that keyword, and return them to the receiving party. When it comes to searchable encryption, security and efficiency of the search have long been a concern of users and researchers.

In a recent research, Peng Xu et al. have introduced the concept of searchable public key ciphertexts with hidden structures (SPCHSs) (P. Xu, Q. Wu, W. Wang, W. Susilo, J. Domingo-Ferrer, and H. Jin, "Generating searchable public-key ciphertexts with hidden structures for fast keyword search," IEEE Trans. Inf. Forensics Security, vol. 10, no. 9, pp. 1993-2006, September 2015.), wherein all the searchable ciphertexts of the same keyword are organized using an invisible chain, thereby linearizing search complexity. While their instantiated scheme does improve search complexity, the complicated cryptographic operation of pairing during search is linearly dependent to search results, and therefore leaves considerable room for improvement in terms of search efficiency.

This makes how to achieve high-speed search a pressing need to be addressed for designing a practical searchable public-key encryption scheme.

In addition, tremendous development of Industrial Internet of Things (IIoT) has been fueled by Industry 4.0, and wireless sensor networks (WSNs), particularly cloud-assisted wireless sensor networks (CWSNs), as an essential part of IIoT, has been applied into more and more areas, like healthcare, agriculture technology, national defense, environmental monitoring and smart conferencing. Since the data collected by sensors are usually of high sensitivity, data privacy protection has become a hot topic in the field of CWSNs.

Many encryption methods have been applied to CSWNs by researchers, such as homomorphic encryption, attribute-based encryption, hybrid encryption, symmetric encryption and so on. These cryptography schemes are focused on safe data transmission and storage in CSWNs. As to secure data search, searchable public key encryption with keyword search (PEKS) is a recognized solution. However, the existing PEKS schemes seem less efficient when it comes to generation of searchable ciphertexts and search of ciphertext data. In a CSWN model, data are encrypted by sensors. Considering that such sensors have limitations regarding power and calculation capability, we do need a lightweight encryption algorithm to reduce sensor costs.

SUMMARY

In view of the shortcomings of the prior art, the present invention provides a method of searchable public-key encryption. The disclosed method ensures constant-grade pairing, significantly simplifies cryptographic operation during search, and further improves search efficiency from the perspective of calculation, thereby making searchable public-key encryption more practical in real-world application scenarios.

The present invention discloses a method of searchable public-key encryption, comprising the steps of: constructing a pairing according to a predetermined security parameter, and outputting a public parameter PK and a private key SK; a transmitting party initializing a searchable ciphertext structure according to the public parameter PK, and outputting a public part Pub and a private part Pri of the structure; the transmitting party inputting a keyword W, the public parameter PK, and the private part Pri of the structure, generating a searchable ciphertext corresponding to the keyword W using an encryption algorithm and uploading the searchable ciphertext to a server, wherein the step of generating a searchable ciphertext corresponding to the keyword W using an encryption algorithm further comprises: determining whether the keyword W is encrypted for the first time, and if the keyword W is encrypted for the first time, applying a first encryption algorithm, or if the keyword W is not encrypted for the first time, applying a second encryption algorithm different from the first encryption algorithm, wherein the second encryption algorithm is used to generate a second searchable ciphertext; wherein the first encryption algorithm comprises a pairing operation, and the second searchable ciphertext generated using the second encryption algorithm is relevant to the searchable ciphertext generated when the keyword W was encrypted last time through an implication relation; a receiving party inputting the keyword W and the private key SK, outputting a search trapdoor $T_W$ and submitting the search trapdoor $T_W$ to the server, wherein the search trapdoor $T_w = H_1(W)^\alpha$; and the server inputting the search trapdoor $T_W$, the public parameter PK, and a searchable ciphertext set composed of plural searchable ciphertexts, executing a search algorithm, performing a pairing operation to find out the searchable ciphertext corresponding to the keyword W generated using the first encryption algorithm, and identifying the searchable ciphertext corresponding to the keyword W generated using the second encryption algorithm through the implication relation.

According to a preferred mode, the second encryption algorithm does not involve a pairing and a second computational load of the second encryption algorithm is smaller than a first computational load of the first encryption algorithm.

According to a preferred mode, the public parameter PK=(q, G, $G_1$, g, ê, P, $H_1$, $H_2$), and the private key SK=α, public key P=$g^α$. Therein, q is a prime number, G and $G_1$ are two multiplicative groups with a prime order q, g is a generator of Group G, ê: G×G→$G_1$ is a pairing that is calculable, bilinear, and non-degenerate, $H_1$ and $H_2$ are two cryptographic hash functions, being a first cryptographic hash function $H_1$:{0,1}*→G and a second cryptographic hash function $H_2$:$G_1$→{0,1}$^{\log q}$, respectively.

According to a preferred mode, the step of the transmitting party initializing a searchable ciphertext structure according to the public parameter PK, and outputting a public part Pub of the structure and a private part Pri of the structure further comprises: running a random-number-generating algorithm to obtain a random number u, performing exponentiation, initializing the structure and outputting the public part Pub=$g^u$ of the structure and the private part Pri=(u) of the structure. Therein, the private part Pri of the structure is a variable length list in the form of (u, {(W, Pt)|Pt∈$G_1$}), and is initialized into (u), and uploading the public part Pub of the structure to the server.

According to a preferred mode, the step of the transmitting party inputting a keyword W, the public parameter PK, and the private part Pri of the structure, generating a searchable ciphertext corresponding to the keyword W using an encryption algorithm and uploading the searchable ciphertext to a server further comprises: the transmitting party inputting a keyword W, the public parameter PK, and the private part Pri of the structure, check whether (W, Pt) exists in the private part Pri of the structure according to the keyword W, and if (W, Pt) does not exist in the private part Pri of the structure, determining that the keyword W is encrypted for the first time, then applying the first encryption algorithm, which comprises: running a random-number-generating algorithm to obtain a random number R, then making Pt=R, generating a private status Pt of the keyword W, inserting (W, Pt) into the private part Pri of the structure, running the first cryptographic hash function $H_1$, performing exponentiation, performing pairing, performing inversion, performing multiply operation, and running the second cryptographic hash function $H_2$, and outputting the searchable ciphertext $$C=(H_2(ê(P^u,H_1(W)),ê(P^u,H_1(W))^{-1}·Pt); \text{ and}$$

if (W, Pt) exists in the private part Pri of the structure, determining that the keyword W is not encrypted for the first time, and then applying the second encryption algorithm, which comprises: running a random-number-generating algorithm to obtain a random number R, running the second cryptographic hash function $H_2$, performing inversion, and performing multiply operation, and outputting the searchable ciphertext C=($H_2$(Pt), $Pt^{-1}$·R), then making Pt=R, and updating the private status Pt of the keyword in the private part Pri of the structure.

According to a preferred mode, the search trapdoor $T_w$=$H_1(W)^α$.

According to a preferred mode, the step of the server inputting the search trapdoor $T_W$, the public parameter PK, and a searchable ciphertext set composed of plural searchable ciphertexts, executing a search algorithm, performing a pairing operation to find out the searchable ciphertext corresponding to the keyword W generated using the first encryption algorithm, and identifying the searchable ciphertext corresponding to the keyword W generated using the second encryption algorithm through the implication relation further comprises:

the server inputting the search trapdoor $T_W$, the public parameter PK, the searchable ciphertext set, and the public part Pub of the structure, performing pairing calculation Pt'=ê(Pub, $T_w$), running the second cryptographic hash function $H_2$, and generating a first part $\mathbb{C}$[i, 1]=$H_2$(Pt') of the searchable ciphertext; the server performing matching search on the first part $\mathbb{C}$[i, 1] of the searchable ciphertext in the searchable ciphertext set, and determining whether any matching searchable ciphertext is found; and if a matching searchable ciphertext is found, identifying a second part $\mathbb{C}$[i, 2] of the matching searchable ciphertext in Step 520, calculating Pt'=Pt'·$\mathbb{C}$[i, 2], then running the second cryptographic hash function $H_2$, generating the first part $\mathbb{C}$[i, 1]=$H_2$(Pt') of the searchable ciphertext to be searched next time, and then returning to performing matching search on the first part $\mathbb{C}$[i, 1] of the searchable ciphertext in the searchable ciphertext set, and determining whether any matching searchable ciphertext is found; and if no matching searchable ciphertext is found, the server stops searching and outputs the found searchable ciphertext. Except for the searchable ciphertext corresponding to the search keyword W when it is encrypted for the first time, none of the subsequent searchable ciphertexts of the keyword W requires pairing. This significantly reduces the computational costs required by search, and improves search efficiency.

The present invention also discloses a practical searchable public-key encryption system, which comprises a key distribution center, a server, a receiving party, and a transmitting party. The key distribution center constructs a pairing according to a predetermined security parameter, and outputs a public parameter PK and a private key SK. The transmitting patty according to the public parameter PK initializes a searchable ciphertext structure, and outputs a public part Pub and a private part Pri of the structure. The transmitting party inputs the keyword W, the public parameter PK, and the private part Pri, generates a searchable ciphertext corresponding to the keyword W using an encryption algorithm and uploads it to the server. The step of generating a searchable ciphertext corresponding to the keyword W using an encryption algorithm comprises: determining whether the keyword W is encrypted for the first time, and if the keyword W is encrypted for the first time, applying a first encryption algorithm, or if the keyword W is not encrypted for the first time, applying a second encryption algorithm different from the first encryption algorithm, wherein the second encryption algorithm is used to generate a second searchable ciphertext; wherein the first encryption algorithm comprises a pairing operation, and the searchable ciphertext generated using the second encryption algorithm is relevant to the searchable ciphertext generated when the keyword W was encrypted last time through an implication relation. The receiving party inputs the keyword W and the private key SK, outputs a search trapdoor $T_W$ and submits the search trapdoor $T_W$ to the server, wherein the search trapdoor $T_w$=$H_1(W)^α$. The server inputs the search trapdoor $T_W$, the public parameter PK, and a searchable ciphertext set composed of plural searchable ciphertexts, executes a search algorithm, performs a pairing operation to find out the searchable ciphertext corresponding to the keyword W generated using the first encryption algorithm, and identifies the searchable ciphertext corresponding to the keyword W generated using the second encryption algorithm through the implication relation.

According to a preferred mode, the second encryption algorithm does not involve a pairing and a second computational load of the second encryption algorithm is smaller than a first computational load of the first encryption algorithm.

The present invention also discloses a server, the server constructs a pairing according to a predetermined security parameter, and outputs a public parameter PK and a private key SK, then sends the public parameter PK to a transmitting party, and sends the private key to a receiving party. The transmitting party according to the public parameter PK initializes a searchable ciphertext structure, and outputs a public part Pub of the structure and a private part Pri of the structure. The transmitting party inputs a keyword W, the public parameter PK, and the private part Pri, generates a searchable ciphertext corresponding to the keyword W using an encryption algorithm, and uploads it to the server. The step of generating a searchable ciphertext corresponding to the keyword W using an encryption algorithm comprises: determining whether the keyword W is encrypted for the first time, and if the keyword W is encrypted for the first time, applying a first encryption algorithm, or if the keyword W is not encrypted for the first time, applying a second encryption algorithm different from the first encryption algorithm, wherein the second encryption algorithm is used to generate a second searchable ciphertext; wherein the first encryption algorithm comprises pairing operation, and the searchable ciphertext generated using the second encryption algorithm is relevant to the searchable ciphertext generated when the keyword W was encrypted last time through an implication relation. The receiving party inputs the keyword W and the private key SK, outputs a search trapdoor $T_W$ and submits the search trapdoor $T_W$ to the server, wherein the search trapdoor $T_w = H_1(W)^\alpha$. The server inputs the search trapdoor $T_W$, the public parameter PK, and a searchable ciphertext set composed of plural searchable ciphertexts, executes a search algorithm, performs a pairing operation to find out the searchable ciphertext corresponding to the keyword W generated using the first encryption algorithm, and finds out the searchable ciphertext corresponding to the keyword W generated using the second encryption algorithm through the implication relation.

The method of searchable public-key encryption, and the system and the server using the same of present invention have at least the following benefits:
(1) They are suitable for secure search of outsourced data in multi-user scenarios;
(2) They enable secure search of data in servers in untrusted network environments; and
(3) They achieve encryption and search with a simple algorithmic process involving short searchable ciphertexts, and reduce time costs from the perspective of calculation without compromising semantic security, so as to make pairing in the search algorithm constant-grade, thereby significantly improving efficiency of searchable public-key encryption.

DETAILED DESCRIPTION

The following description, in conjunction with the accompanying drawings and preferred embodiments, is set forth as below to illustrate the present invention.

As used throughout this application, the term "may" is of permitted meaning (i.e., possibly) but not compulsory meaning (i.e., essentially). Similarly, the terms "comprising", "including" and "consisting" mean "comprising but not limited to".

The phrases "at least one", "one or more" and "and/or" are for open expression and shall cover both connected and separate operations. For example, each of "at least one of A, B and C", "at least one of A, B or C", "one or more of A, B and C", "A, B or C" and "A, B and/or C" may refer to A solely, B solely, C solely, A and B, A and C, B and C or A, B and C.

The term "a" or "an" article refers to one or more articles. As such, the terms "a" (or "an"), "one or more" and "at least one" are interchangeable herein. It is also to be noted that the term "comprising", "including" and "having" used herein are interchangeable.

Some terms referred to in the present invention are defined first as below.

A key distribution center has functions of creating systems, and generating and distributing public and private key to users. It may be a trusted third-party organization. The realization of its specific functions may be enabled using devices capable of data processing.

A transmitting party has functions of encrypting documents and keywords, and creating ciphertext indexes. It may be an individual or an organization. The realization of its specific functions may be enabled using devices capable of data processing.

A receiving party has functions of decrypting ciphertext documents and generating search trapdoors. It may be an individual or an organization. The realization of its specific functions may be enabled using devices capable of data processing.

A server is an organization having functions of storing document ciphertexts and keyword searchable ciphertext, and performing search. The realization of its specific functions may be enabled using devices capable of data processing.

A device capable of data processing may be at least one of a server, a server cluster, a workstation, a supercomputer, a desktop computer, a laptop computer, a tablet computer and a smartphone. People skilled in the art may select the exact equipment according to actual computational loads and/or user needs.

Embodiment 1

Figure 1:
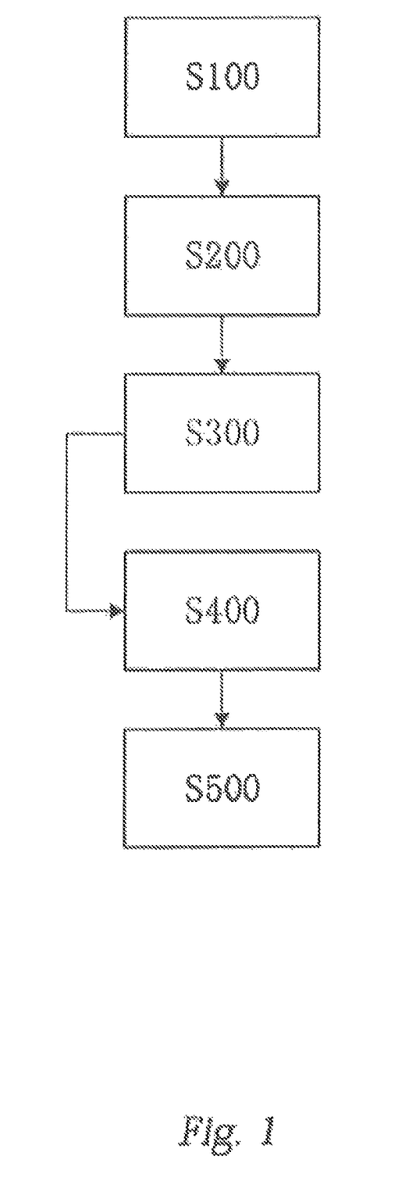
FIG. 1 is a flowchart of one preferred mode of the disclosed method.

Referring to FIG. 1, the present embodiment discloses a method of searchable public-key encryption. Without causing conflicts or contradiction, the preferred modes for other embodiments may be incorporated into the present embodiment as supplement.

According to a preferred mode, the disclosed method may comprise Step 100: constructing a pairing according to a predetermined security parameter, and outputting a public parameter PK and a private key SK. Preferably, the public parameter PK is public. In other words, it is accessible to anyone, such as the transmitting party A and/or the server B. The private key SK is stored by the receiving party C in a secret way. It is to be noted that in some other literatures a public parameter PK may be referred to as a master public key PK, and a private key SK may be referred to as a master private key SK, or any other equivalent name(s) as mentioned in the present invention. All these terms shall be included in the scope of the present invention as long as they are consistent with the ideas expressed in the present invention.

Preferably, "constructing a pairing" as mentioned in Step 100 involves: having a key distribution center D input a security parameter $1^k$. According to the size of k, the key distribution center D selects a proper elliptic curve: $Y^2=X^3+aX+b$. Therein, a and b are coefficients. The points along the elliptic curve form two groups having with a prime order q, namely G, and $G_1$. A function mapping ê is selected to map the elements in Group G into Group $G_1$. The greater the value of the security parameter $1^k$ is, the more points are selected along the elliptic curve, and the larger the groups are.

According to a preferred mode, the method may further comprise Step 200: transmitting party A, according to the public parameter PK, initializing a searchable ciphertext structure, and outputting a public part Pub of the structure and a private part Pri of the structure. Preferably, the public part Pub of the structure May be uploaded to the server B. The private part Pri of the structure may be stored locally by the transmitting party A in a secret way.

According to a preferred mode, the method may further comprise Step 300: the transmitting party inputting a keyword W, the public parameter PK, and the private part Pri of the structure, generating a searchable ciphertext corresponding to the keyword W using an encryption algorithm and upload the searchable ciphertext to a server B. Preferably, the step of generating a searchable ciphertext corresponding to the keyword W using an encryption algorithm comprises: determining whether the keyword W is encrypted for the first time, and if the keyword W is encrypted for the first time, applying a first encryption algorithm, or if the keyword W is not encrypted for the first time, applying a second encryption algorithm different from the first encryption algorithm, wherein the second encryption algorithm is used to generate a second searchable ciphertext. Preferably, the first encryption algorithm may comprise a pairing operation. The searchable ciphertext generated using the second encryption algorithm may be relevant to the searchable ciphertext generated when the keyword W was encrypted last time through an implication relation.

According to a preferred mode, the method may further comprise Step 400: a receiving party C inputting the keyword W and the private key SK, and outputting a search trapdoor $T_W$ and submit the search trapdoor $T_W$ to the server B, wherein the search trapdoor $T_W=H_1(W)^\alpha$. Preferably, the receiving party C sends the search trapdoor $T_W$ to the server B through a secure channel. This prevents unauthorized use of search trapdoor $T_W$ for search, thereby improving search security.

According to a preferred mode, the method may further comprise Step 500: the server B inputting the search trapdoor $T_W$, the public parameter PK and a searchable ciphertext set composed of plural searchable ciphertexts, executing a search algorithm, performing a pairing operation to find out the searchable ciphertext corresponding to the keyword W generated using the first encryption algorithm, and identifying the searchable ciphertext corresponding to the keyword W generated using the second encryption algorithm through the implication relation. The second encryption algorithm not only performs encryption and generates the searchable ciphertext corresponding to the current keyword W, but also gradually constructs the implication relation between the searchable ciphertext corresponding to the keyword W currently to be encrypted and the keyword W encrypted the last time. With this implication relation, the computational load during search can be reduced. In this way, the present invention reduces time costs from the perspective of calculation without compromising semantic security, so as to improve search efficiency.

According to a preferred mode, the first computational load of the first encryption algorithm is greater than the second computational load of the second encryption algorithm. This helps to reduce the computational costs for the second and subsequent times of encryption for the relevant keyword, and improves encryption efficiency. Preferably, the second encryption algorithm does not involve a pairing that requires considerable computational costs. In this way, pairing in the search algorithm is of the constant grade, and thus searchable public-key encryption can be much more efficient, allowing searchable public-key encryption to be more practical in real-world application scenarios. In terms of results, the search speed achieved by the present invention is comparable with the schemes based on searchable symmetric encryption.

According to a preferred mode, the public parameter PK=(q, G, $G_1$, g, ê, P, $H_1$, $H_2$), and the private key SK=α, the public key P=$g^\alpha$. Preferably, q is a prime number, G and $G_1$ are two multiplicative groups with a prime order q, g is a generator of Group G, ê: G×G→$G_1$ is a pairing that is calculable, bilinear, and non-degenerate, $H_1$ and $H_2$ are two cryptographic hash functions, being a first cryptographic hash function $H_1$:$\{0,1\}^* \to G$ and a second cryptographic hash function $H_2$:$G_1 \to \{0,1\}^{\log q}$, respectively. Preferably, the cryptographic hash functions used in the present invention have two basic characteristics: one-way property and collision resistance. Having one-way property means that it is only possible to deduce an output of a hash function from its input, and it is impossible to inversely calculate the input of the hash function with its known output. Having collision resistance means that there are not two different inputs leading to the same result of the hash function. In the present invention, the first cryptographic hash function $H_1$ takes the keyword as its input, expressed in an arbitrary string, and its output is the elements of Group G. The second cryptographic hash function $H_2$ takes Group $G_1$ as its input, and its output is a fixed-length string.

According to a preferred mode, Step 200 may comprise: running a random-number-generating algorithm to obtain a random number u, performing exponentiation, initializing the structure and outputting the public part Pub=$g^u$ of the structure and the private part Pri=(u) of the structure. Preferably, the private part Pri of the structure is a variable length list in the form of (u, {(W, Pt)|Pt∈$G_1$}) and is initialized into (u). Preferably, the public part Pub of the structure is uploaded to the server B.

Figure 2:
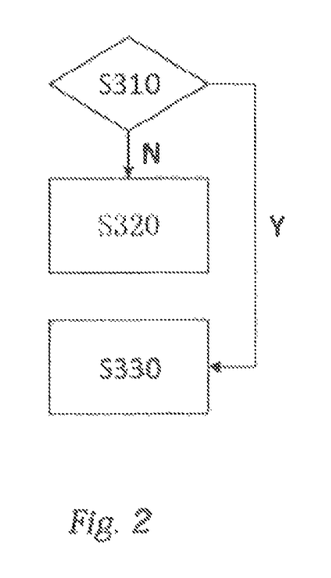
FIG. 2 is a flowchart of one preferred mode of Step 300.

According to a preferred mode, referring to FIG. 2, Step 300 may comprise: Step 310: the transmitting party A inputting a keyword W, the public parameter PK, and the private part Pri of the structure, checking whether (W, Pt) exists in the private part Pri of the structure according to the keyword W, and if (W, Pt) exists in the private part Pri of the structure according to the keyword W, determining that the keyword W is not encrypted for the first time, and proceeding with Step 330, and if (W, Pt) does not exist in the private part Pri of the structure according to the keyword W, determining that the keyword W is encrypted for the first time, and proceeding with Step 320; Step 320: applying the first encryption algorithm, which comprises: running a random-number-generating algorithm to obtain a random number R, then making Pt=R, generating a private status Pt of the keyword W, inserting (W, Pt) into the private part Pri of the structure, running the first cryptographic hash function $H_1$, performing exponentiation, performing pairing, performing inversion, performing multiply operation, and running the second cryptographic hash functions $H_2$, and outputting the searchable ciphertext $$C=(H_2(\hat{e}(P^u,H_1(W)),\hat{e}(P^u,H_1(W))^{-1}\cdot Pt);\text{ and}$$

Step 330: applying the second encryption algorithm, which comprises: running a random-number-generating algorithm to obtain a random number R, running the second cryptographic hash function $H_2$, performing inversion, and performing multiply operation, and outputting the searchable ciphertext C=$(H_2(Pt), Pt^{-1}\cdot R)$, then making Pt=R, and updating the private status Pt of the keyword in the private part Pri of the structure. The second encryption algorithm does not involve pairing, and encrypts the keyword and constructs the implication relation with less computational load, thereby greatly reducing computational costs and improving encryption efficiency. The computational costs for the subsequent search can be lowered accordingly, thereby improving search efficiency.

According to a preferred mode, search trapdoor $T_w=H_1(W)^\alpha$.

Figure 3:
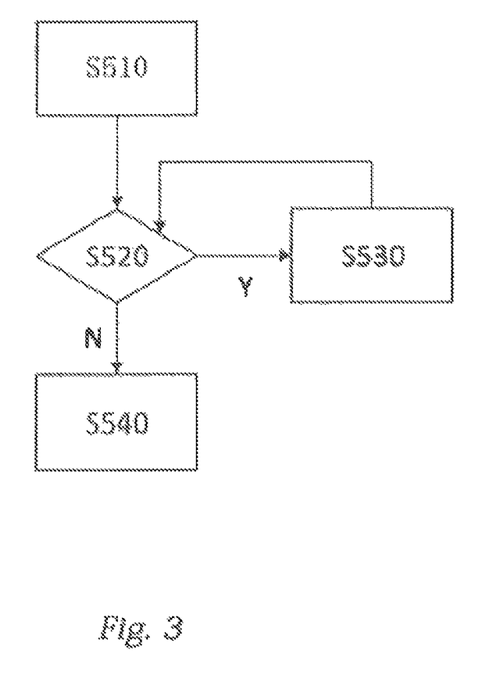
FIG. 3 is a flowchart of one preferred mode of Step 500.

According to a preferred mode, referring to FIG. 3, Step 500 may comprise: Step 510: the server B inputting the search trapdoor $T_w$, the public parameter PK, the searchable ciphertext set, and the public part Pub of the structure, performing pairing calculation Pt'=ê(Pub, $T_w$), running the second cryptographic hash function $H_2$, and generating a first part $\mathbb{C}$[i, 1]=$H_2$(Pt') of the searchable ciphertext; Step 520: the server B performing matching search on the first part $\mathbb{C}$[i, 1] of the searchable ciphertext in the searchable ciphertext set, and determining whether any matching searchable ciphertext is found, and if a matching searchable ciphertext is found, proceeding with Step 530, and if no matching searchable ciphertext is found, the method proceeding with Step 540; Step 530: identifying a second part $\mathbb{C}$[i, 2] of the matching searchable ciphertext in Step 520, calculating Pt'=Pt'·$\mathbb{C}$[i, 2], then running the second cryptographic hash function $H_2$, generating the first part $\mathbb{C}$[i, 1]=$H_2$(Pt') of the searchable ciphertext to be searched next time, and proceeding with Step 520; and Step 540: the server (B) stops searching and outputs the found searchable ciphertext.

Figure 5:
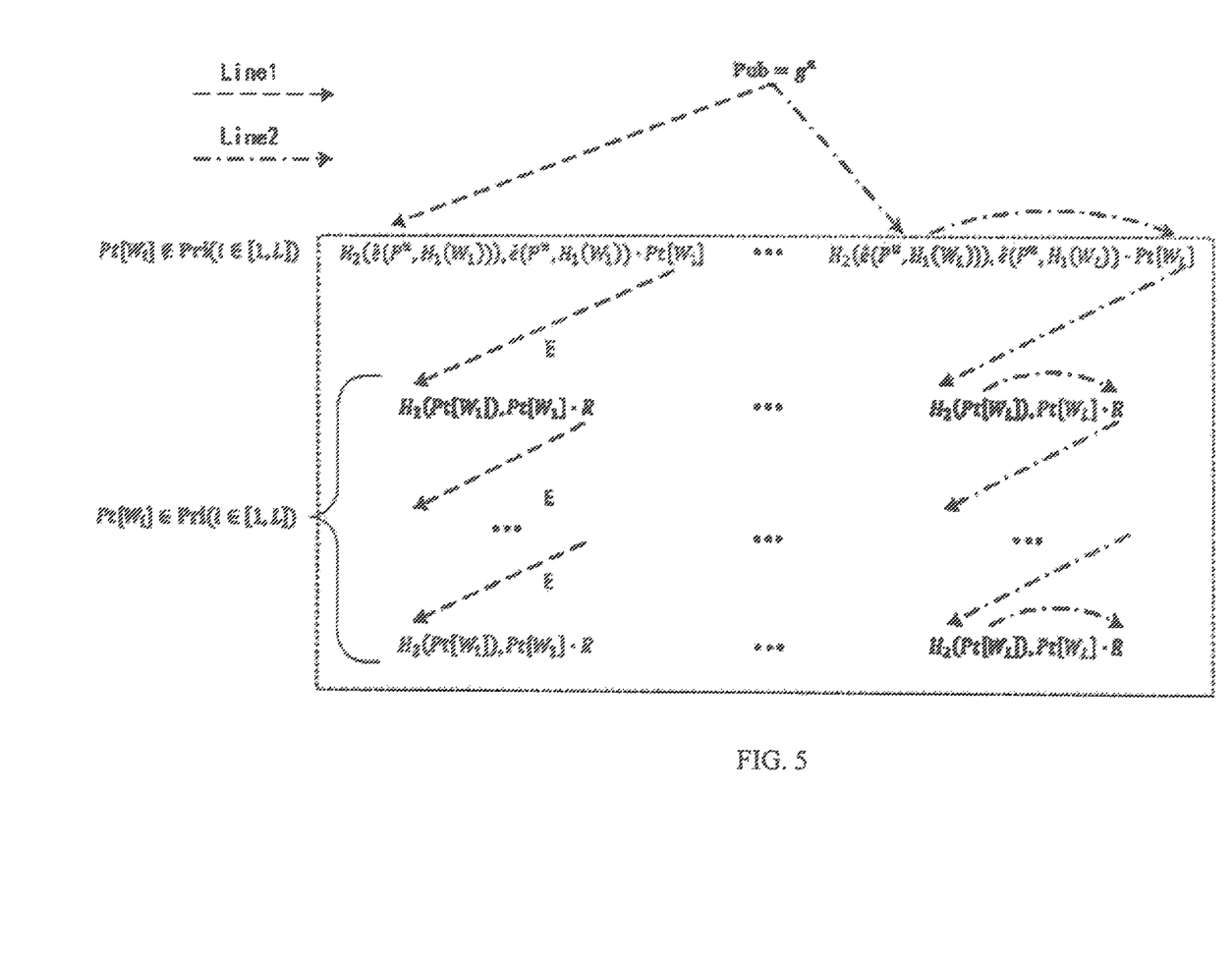
FIG. 5 schematically illustrates encryption and search of the present invention.

Referring to FIG. 5, FIG. 5 illustrates encryption and search according to the present invention. Therein, the dotted-line arrow Line1 represents encryption, the dash line arrow Line2 represents search. The dotted-line frame frames the searchable ciphertext set. Pt[$W_i$] denotes the private status Pt corresponding to the keyword $W_i$. Therein, i∈[1, L]. W1 to WL represent different keywords W, respectively. For the sake of simplification, encryption for the keywords $W_2$ to $W_L$ are omitted from the drawing and search for the keywords W1 to WL−1 are omitted from the drawing. During encryption, the searchable ciphertexts of the keywords W encrypted last time are successively associated to the searchable ciphertexts of the keywords W encrypted thereafter through the implication relation E. For encryption, pairing has to be performed one time only, and the subsequent work of constructing the implication relation is done using an encryption algorithm without pairing. For search, a pairing has to be performed one time only, and the subsequent work of exposing the implication relation is done using a search algorithm without pairing to successively obtain the subsequent searchable ciphertexts. With this method, the computational costs for encryption and search can be significantly reduced, thereby improving efficiency of both encryption and search.

Embodiment 2

The present embodiment is further improvement based on Embodiment 1, and the repeated description is omitted herein. Without causing conflicts or contradiction, the preferred modes for other embodiments may be incorporated into the present embodiment as supplement.

According to a preferred mode, the disclosed method may further comprise: extracting the keyword.

Preferably, the step of extracting the keyword comprise: acquiring the document to be encrypted; according to predetermined keyword sample set, extracting keywords from the documents to be encrypted so that the keyword sample set comprises keywords of different levels of granularity; taking the extracted keywords as the keywords of the document to be encrypted. In this way, the keywords can be obtained efficiently and comprehensively, and the problems about missing or wrongly extracting keywords caused by the transmitting party A and failure of the receiving party C in effectively finding the relevant documents due to inconsistent understanding to the documents between the receiving party C and the transmitting party A can be prevented.

According to a preferred mode, the disclosed method further comprises: constructing the keyword sample set; therein, the step of constructing the keyword sample set comprises: the transmitting party A providing plural keyword sample articles of the relevant area; performing natural language analysis on sentences in the keyword sample articles, and cutting the sentences into phrases with different levels of granularity; calculating the score of the phrases with different levels of granularity; according to the phrases that have scores exceeding a predetermined threshold, generating a predetermined keyword sample set. In this way, the keywords known to people in the relevant area can be extracted from the document to be encrypted more accurately, so that the receiving party can identify the corresponding ciphertext documents faster and more effectively in the search process. Preferably, the keyword sample articles may be at least one of a thesis, a teaching material, a dictionary and a manual in the relevant area. Preferably, the relevant area, as used herein, is the area to which the document to be encrypted belongs.

Embodiment 3

The present embodiment is further improvement based on Embodiment 1, 2 or a combination thereof, and the repeated description is omitted herein. Without causing conflicts or contradiction, the preferred modes for other embodiments may be incorporated into the present embodiment as supplement.

Figure 4:
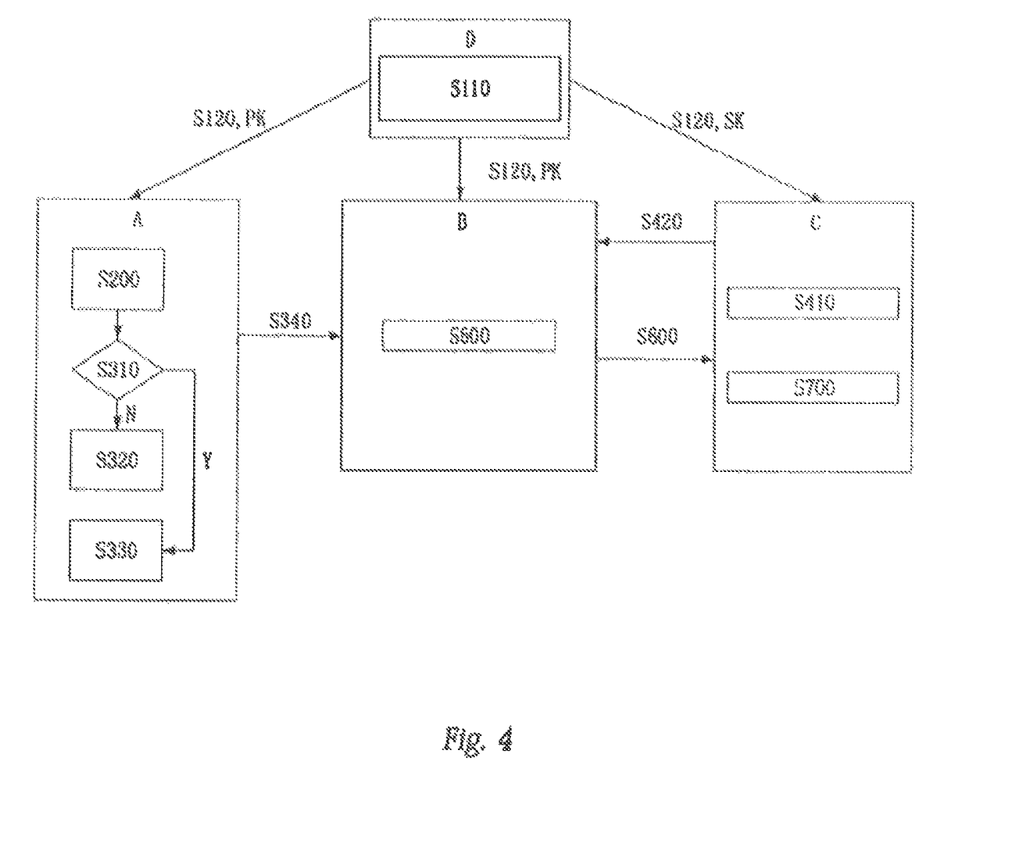
FIG. 4 is a block diagram of one preferred mode of the disclosed system.

Referring to FIG. 4, the present invention also discloses a practical searchable public-key encryption system, which is suitable for performing the steps of the method recited in the present invention, so as to provide the expected technical effects. In the present embodiment, the key distribution center D is stand-alone. The stand-alone key distribution center may better ensure the security of the system. Particularly, where the key distribution center D and the server B belong to different owners, this arrangement reduces the risk of betrayal of the private key at the server B, and prevents the server B from accessing specific situations of the keywords W and intercepting private documents of users using the private key without authorization.

According to a preferred mode, the system comprises key distribution center D, server B, receiving party C and transmitting party A, key distribution center D constructing a pairing according to a predetermined security parameter, and outputting a public parameter PK and a private key SK; the transmitting party A initializing a searchable ciphertext structure according to the public parameter PK, and outputting a public part Pub of the structure and a private part Pri of the structure; the transmitting party A inputting a keyword W, the public parameter PK, and the private part Pri of the structure, generating a searchable ciphertext corresponding to the keyword W using an encryption algorithm and uploading the searchable ciphertext to server B, wherein generation of the searchable ciphertext corresponding to the keyword W using the encryption algorithm involves: determining whether the keyword W is encrypted for the first time, and if the keyword W is encrypted for the first time, applying a first encryption algorithm, and if the keyword W is not encrypted for the first time, applying a second encryption algorithm different from the first encryption algorithm, wherein the second encryption algorithm is used to generate a second searchable ciphertext; wherein the first encryption algorithm comprises a pairing operation, and the searchable ciphertext generated using the second encryption algorithm is relevant to the searchable ciphertext generated when the keyword W was encrypted last time through an implication relation; the receiving party C inputting the keyword W and the private key SK, outputting a search trapdoor $T_W$ and submitting the search trapdoor $T_W$ to the server B, wherein the search trapdoor $T_w = H_1(W)^\alpha$; and the server B inputting the search trapdoor $T_W$, the public parameter PK, and a searchable ciphertext set composed of plural searchable ciphertexts, executing a search algorithm, performing a pairing operation to find out the searchable ciphertext corresponding to the keyword W generated using the first encryption algorithm, and identifying the searchable ciphertext corresponding to the keyword W generated using the second encryption algorithm through the implication relation E.

According to a preferred mode, the second encryption algorithm does not involve a pairing operation and the second computational load of the second encryption algorithm smaller than the first computational load of the first encryption algorithm.

Embodiment 4

The present embodiment is further improvement based on Embodiment 1, 2 3 or a combination thereof, and the repeated description is omitted herein. Without causing conflicts or contradiction, the preferred modes for other embodiments may be incorporated into the present embodiment as supplement.

Referring again to FIG. 4, according to a preferred mode, Step 100 may comprise: Step S110: inputting a security parameter $1^k$, constructing the corresponding pairing: ê: G×G→$G_1$, where G and $G_1$ are two multiplicative groups with a prime order q, and g is a generator of Group G, running a random-number-generating algorithm:

$$\alpha \xleftarrow{R} F_q^*,$$

private key SK=α, performing exponentiation to get the public key P=$g^\alpha$, selecting two cryptographic hash functions $H_1: \{0,1\}^* \to G$ and $H_2: G_1 \to \{0,1\}^{\log q}$, making the public parameter PK=(q, G, $G_1$, g, ê, P, $H_1$, $H_2$), and outputting a public parameter PK and a private key SK; and Step S120: sending the public parameter PK to the transmitting party A and/or server B, and sending the private key SK to the receiving party C.

Preferably, Step S110 may be performed by the key distribution center D.

Preferably, the step of running the random-number-generating algorithm $$\alpha \xleftarrow{R} F_q^*$$

may comprise: according to the selected elliptic curve: $Y^2 = X^3 + aX + b$ randomly selecting a value $x_1$ of an independent variable X, calculating a value $y_1$ of a corresponding dependent variable Y; and when the point ($x_1$, $y_1$) is in the group to be mapped, the random element is successfully generated; and when the point (x1,y1) is not in the group to be mapped, continuing selecting the value of X, until the points appearing in the group to be mapped are found. In addition, the field $F_q^*$ represents the set $\{1, 2 \ldots q-1\}$.

Preferably, the random-number-generating algorithm for randomly selecting elements from field $F_q^*$ mentioned in the present invention may be performed by using API from a Pairing-Based Cryptosystems (PBC) function library.

Preferably, the random-number-generating algorithm $$u \xleftarrow{R} F_q^*$$

mentioned in the present invention is performed using the foregoing method likewise. The random-number-generating algorithm $$R \xleftarrow{R} G_1$$

mentioned in the present invention may be performed by using API from a Pairing-Based Cryptosystems (PBC) function library likewise.

Preferably, the cryptographic hash functions $H_1$, $H_2$ mentioned in the present invention may be performed by using API from a Pairing-Based Cryptosystems (PBC) function library.

According to a preferred mode, Step 200 may comprise: the transmitting party A inputting the public parameter PK, running a random-number-generating algorithm $$u \xleftarrow{\$} F_q^*,$$

and outputting a structure (Pri=(u), Pub=$g^u$). Preferably, the public part Pub=$g^u$ of the structure is obtained through exponentiation. Preferably, the private part Pri of the structure may be a variable length list in the form of (u, {(W, Pt)|Pt∈$G_1$}) and initialized into (u).

Preferably, the private part Pri of the structure may be stored locally by the transmitting party A in a secret way. Alternatively, the private part Pri of the structure may be encrypted and stored at a third party by the transmitting party A. This helps to prevent the private part Pri of the structure from occupying the local memory and what is stored at the third party may be reserved as a backup, so that in the event of damages to the local data, the subsequent implication relation can be restored easily.

According to a preferred mode, Step 310 may comprise: the transmitting party A extracting the relevant keyword W for the document to be encrypted, using the symmetric key agreed with the receiving party C to encrypt the document, and generating the corresponding ciphertext document; and the transmitting party A inputting the keyword W, checking whether (W, Pt) exists in the private part Pri of the structure according to the keyword W, and if (W, Pt) exists in the private part Pri of the structure, determining that the keyword W is not encrypted for the first time, and proceeding with Step 330, and if (W, Pt) does not exist in the private part Pri of the structure, determining that the keyword W is encrypted for the first time, and proceeding with Step 320.

According to a preferred mode, Step 320 may comprise: running a random-number-generating algorithm $$R \xleftarrow{\$} G_1,$$

making Pt=R, inserting (W, Pt) into the private part Pri of the structure, running the first cryptographic hash function $H_1$, performing exponentiation, performing pairing, performing inversion, performing multiply operation, and running the second cryptographic hash function $H_2$, and outputting the searchable ciphertext $$C=(H_2(\hat{e}(P^u,H_1(W))),\hat{e}(P^u,H_1(W))^{-1}\cdot Pt).$$

According to a preferred mode, Step 330 may comprise: running a random-number-generating algorithm:

$$R \xleftarrow{\$} G_1,$$

running the cryptographic hash function, performing inversion, and performing multiply operation, outputting the searchable ciphertext C=($H_2$(Pt), $Pt^{-1}\cdot R$), then making Pt=R, and updating (W, Pt) in the private part Pri of the structure.

According to a preferred mode, Step 300 may further comprise: Step 340: the transmitting party A uploading the ciphertext document and the searchable ciphertext related thereto to the server B.

Preferably, after receiving the ciphertext document and the searchable ciphertext related thereto, the server B stores the ciphertext document and the searchable ciphertext related thereto in a relational way.

According to a preferred mode, Step 400 may comprise: Step 410: the receiving party C inputting the keyword W and the private key SK, and running the first cryptographic hash function $H_1$ and performing exponentiation, so as to obtain a search trapdoor $T_w=H_1(W)^\alpha$; Step 420: the receiving party C generating a search request and sending the search request together with the generated search trapdoor $T_w$ to the server B.

According to a preferred mode, Step 510 may comprise: the server B inputting the search trapdoor $T_w$, the public parameter PK, the searchable ciphertext set and the public part Pub of the structure, performing pairing, calculating Pt'=ê(Pub, $T_w$), running the second cryptographic hash function $H_2$, and generating the first part $\mathbb{C}$[i, 1] of the searchable ciphertext, so as to obtain $\mathbb{C}$[i, 1]=$H_2$(Pt').

According to a preferred mode, Step 520 may comprise: the server B performing matching in the searchable ciphertext set according to the obtained $\mathbb{C}$[i, 1], and if a matching searchable ciphertext is found, proceeding with Step 530, and if no matching searchable ciphertext is found, proceeding with Step 540.

According to a preferred mode, Step 530 may comprise: expressing the second part of the found searchable ciphertext with $\mathbb{C}$[i, 2], calculating Pt'=Pt'·$\mathbb{C}$[i, 2], then calculating $\mathbb{C}$[i, 1]=$H_2$(Pt'), and proceeding with Step 520.

According to a preferred mode, Step 540 may comprise: returning all the searchable ciphertexts that have been found and stopping search.

According to a preferred mode, the present invention may further comprise: Step 600: the server B, according to the found searchable ciphertext, returning the ciphertext document related to the receiving party C to the receiving party C.

According to a preferred mode, the present invention may further comprise: Step 700: the receiving party C decrypting the ciphertext document using the symmetric key it has agreed on with the transmitting party A.

Embodiment 5

The present embodiment is further improvement based on. Embodiment 1, 2, 4 or a combination thereof, and the repeated description is omitted herein. Without causing conflicts or contradiction, the preferred modes for other embodiments may be incorporated into the present embodiment as supplement.

The present invention also discloses a server B that adopts the method recited in the present invention, so as to provide the expected technical effects. In the present embodiment, the function of the key distribution center D is integrated into the server B so as to structurally simplify the system.

According to a preferred mode, the server B constructs a pairing according to a predetermined security parameter, and outputs a public parameter PK and a private key SK. Then, the server B sends the public parameter PK to the transmitting party A, and sends the private key SK to the receiving party C. The transmitting party A, according to the public parameter PK, initializes the searchable ciphertext structure, and outputs a public part Pub of the structure and a private part Pri of the structure. The transmitting party A may input the keyword W, the public parameter PK, and the private part Pri of the structure, generate the searchable ciphertext corresponding to the keyword W through the encryption algorithm and upload it to the server B. The step of generating the searchable ciphertext corresponding to the keyword W using the encryption algorithm may comprise: determining whether the keyword W is encrypted for the first time, and if the keyword W is encrypted for the first time, applying a first encryption algorithm, and if the keyword W is not encrypted for the first time, applying a second encryption algorithm different from the first encryption algorithm, wherein the second encryption algorithm is used to generate a second searchable ciphertext. The encryption algorithm may comprise the first encryption algorithm and the second encryption algorithm. The first encryption algorithm may comprise pairing operation, and the searchable ciphertext generated using the second encryption algorithm is relevant to the searchable ciphertext generated when the keyword W was encrypted last time through an implication relation. The receiving party C inputs the keyword W and the private key SK, outputs a search trapdoor $T_W$ and submits the search trapdoor $T_W$ to the server B, wherein the search trapdoor $T_w = H_1(W)^\alpha$. The server B inputs the search trapdoor $T_W$, the public parameter PK, and a searchable ciphertext set composed of plural searchable ciphertexts. It performs a pairing operation to find out the searchable ciphertext corresponding to the keyword W generated using the first encryption algorithm, and finds out the searchable ciphertext corresponding to the keyword W generated using the second encryption algorithm through the implication relation.

According to a preferred mode, the second encryption algorithm does not involve a pairing operation and the second computational load of the second encryption algorithm is smaller than the first computational load of the first encryption algorithm.

Embodiment 6

The present embodiment is further improvement based on Embodiment 1, 2, 3, 4, 5 or a combination thereof, and the repeated description is omitted herein. Without causing conflicts or contradiction, the preferred modes for other embodiments may be incorporated into the present embodiment as supplement.

The present invention also discloses a server B that adopts the method recited in the present invention, so as to provide the expected technical effects. In the present embodiment, the function of the key distribution center D is integrated into the receiving party C so as to structurally simplify the system. This provide a solution to secure search when the server B is untrusted because the private key is out of the reach of the server B and the search is performed without letting the server B know the keyword W for the search.

According to a preferred mode, the receiving party C constructs pairing according to a predetermined security parameter, and outputs a public parameter PK and a private key SK. Then, the receiving party C sends the public parameter PK to at least one transmitting party A and/or a server B, and stores the private key SK locally in a secret way. The transmitting party A according to public parameter PK initializes a searchable ciphertext structure, and outputs a public part Pub of the structure and a private part Pri of the structure. The transmitting party A inputs a keyword W, the public parameter PK, and the private part Pri of the structure, and generates the searchable ciphertext corresponding to the keyword W using the encryption algorithm and uploads it to the server B. The step of generating the searchable ciphertext corresponding to the keyword W using the encryption algorithm involves: determining whether the keyword W is encrypted for the first time, and if the keyword W is encrypted for the first time, applying a first encryption algorithm, and if the keyword W is not encrypted for the first time, applying a second encryption algorithm different from the first encryption algorithm, wherein the second encryption algorithm is used to generate a second searchable ciphertext. The encryption algorithm may comprise a first encryption algorithm and a second encryption algorithm, wherein the first encryption algorithm comprises a pairing operation, and the searchable ciphertext generated using the second encryption algorithm is relevant to the searchable ciphertext generated when the keyword W was encrypted last time through an implication relation E. The receiving party C inputs the keyword W and the private key SK, outputs a search trapdoor $T_W$ and submits the search trapdoor $T_W$ to the server B, wherein the search trapdoor $T_w = H_1(W)^\alpha$. The server B inputs the search trapdoor $T_W$, the public parameter PK and a searchable ciphertext set composed of plural searchable ciphertexts, executes a search algorithm, and performs a pairing operation to find out the searchable ciphertext corresponding to the keyword W generated using the first encryption algorithm. After the searchable ciphertext corresponding to the keyword W generated using the first encryption algorithm is found, the server B finds out the searchable ciphertext corresponding to the keyword W generated using the second encryption algorithm through the implication relation. Preferably, the server B may store the public parameter PK, and upon receiving the request of acquiring the public parameter PK from a transmitting party A, send the public parameter PK to the transmitting party A.

Embodiment 7

The present embodiment is further improvement based on Embodiment 1, 2, 3, 4, 5 or 6 or a combination thereof, and the repeated description is omitted herein. Without causing conflicts or contradiction, the preferred modes for other embodiments may be incorporated into the present embodiment as supplement.

The present embodiment discloses an encryption chip. The encryption chip is suitable for implementing the steps of the method of the present invention, so as to achieve the expected technical effects.

According to a preferred mode, the encryption chip according to the public parameter PK initializes searchable ciphertext structure, and outputs a public part Pub of the structure and a private part Pri of the structure.

The encryption chip inputs a keyword W, the public parameter PK, and the private part Pri of the structure, and generates a searchable ciphertext corresponding to the keyword W using an encryption algorithm. The step of generating a searchable ciphertext corresponding to the keyword W using an encryption algorithm comprises:
determining whether the keyword W is encrypted for the first time, and if the keyword W is encrypted for the first time, applying a first encryption algorithm, or if the keyword W is not encrypted for the first time, applying a second encryption algorithm different from the first encryption algorithm, wherein the second encryption algorithm is used to generate a second searchable ciphertext; wherein the first encryption algorithm comprises pairing operation, and the searchable ciphertext generated using the second encryption algorithm is relevant to the searchable ciphertext generated when the keyword W was encrypted last time through an implication relation E.

According to a preferred mode, the encryption chip is installed in a device capable of data processing at the side of the transmitting party.

According to another preferred mode, the encryption chip is connected to the transmitting party through universal serial bus (USB) interface so as to perform encryption for the transmitting party.

The use of the encryption chip mentioned in the disclosed method costs less for encryption in terms of calculating resources, and this reduces the configuration requirements of the sensor while speeds up encryption.

Embodiment 8

The present embodiment is further improvement based on Embodiment 1, 2, 3, 4, 5, 6, or 7 or a combination thereof, and the repeated description is omitted herein. Without causing conflicts or contradiction, the preferred modes for other embodiments may be incorporated into the present embodiment as supplement.

The present embodiment discloses a sensor that is suitable for performing the steps of the method of the present invention, so as to provide the expected technical effects.

According to a preferred mode, the sensor according to the public parameter PK initializes a searchable ciphertext structure, and outputs a public part Pub of the structure and a private part Pri of the structure.

The encryption chip inputs a keyword W, the public parameter PK, and the private part Pri, and generates a searchable ciphertext corresponding to the keyword W using an encryption algorithm, wherein the step of generating a searchable ciphertext corresponding to the keyword W using an encryption algorithm comprises:

determining whether the keyword W is encrypted for the first time, and if the keyword W is encrypted for the first time, applying a first encryption algorithm, and if the keyword W is not encrypted for the first time, applying a second encryption algorithm different from the first encryption algorithm, wherein the second encryption algorithm is used to generate a second searchable ciphertext; wherein the first encryption algorithm comprises pairing operation, and the searchable ciphertext generated using the second encryption algorithm is relevant to the searchable ciphertext generated when the keyword W was encrypted last time through an implication relation E.

According to a preferred mode, the sensor is installed in a device capable of data processing at the side of the transmitting party.

According to another preferred mode, the sensor is connected to the transmitting party through USB interface so as to perform encryption for the transmitting party.

The use of the sensor mentioned in the disclosed method costs less for encryption in terms of calculating resources, and this reduces the configuration requirements of the sensor while speeds up encryption.

It is to be noted that, the steps in the method of the present invention are not necessarily performed in the order described herein. As long as the objective of the present invention can be achieved, some of these step may be conducted in a different order, and this shall also be included in the scope of the present invention.

While the above description has illustrated the present invention in detail, it is obvious to those skilled in the art that many modifications may be made without departing from the scope of the present invention and all such modifications are considered a part of the present disclosure. In view of the aforementioned discussion, relevant knowledge in the art and references or information that is referred to in conjunction with the prior art (all incorporated herein by reference), further description is deemed necessary. In addition, it is to be noted that every aspect and every part of any embodiment of the present invention may be combined or interchanged in a whole or partially. Also, people of ordinary skill in the art shall appreciate that the above description is only exemplificative, and is not intended to limit the present invention.

The above discussion has been provided for the purposes of exemplification and description of the present disclosure. This does not mean the present disclosure is limited to the forms disclosed in this specification. In the foregoing embodiments, for example, in order to simplify the objectives of the present disclosure, various features of the present disclosure are combined in one or more embodiments, configurations or aspects. The features in these embodiments, configurations or aspects may be combined with alternative embodiments, configurations or aspects other than those described previously. The disclosed method shall not be interpreted as reflecting the intention that the present disclosure requires more features than those expressively recited in each claim. Rather, as the following claims reflect, inventive aspects lie in less than all features of a single foregoing disclosed embodiment. Therefore, the following claims are herein incorporated into the embodiments, wherein each claim itself acts as a separate embodiment of the present disclosure.

Furthermore, while the description of the present disclosure comprises description to one or more embodiments, configurations or aspects and some variations and modifications, other variations, combinations and modifications are also within the scope of the present disclosure, for example within the scope of skills and knowledge of people in the relevant field, after understanding of the present disclosure. This application is intended to, to the extent where it is allowed, comprise rights to alternative embodiments, configurations or aspects, and rights to alternative, interchangeable and/or equivalent structures, functions, scopes or steps for the rights claimed, no matter whether such alternative, interchangeable and/or equivalent structures, functions, scopes or steps are disclosed herein, and is not intended to surrender any of the patentable subject matters to the public.

What is claimed is:

1. A method of searchable public-key encryption, comprising the following steps:

Step 100: constructing pairing according to a predetermined security parameter, and outputting a public parameter PK and a private key SK;

Step 200: by a transmitting party (A), initializing a searchable ciphertext structure according to the public parameter PK, and outputting a public part Pub of the structure and a private part Pri of the structure;

Step 300: by the transmitting party (A), inputting a keyword W, the public parameter PK, and the private part Pri of the structure, and generating a searchable ciphertext corresponding to the keyword W using an encryption algorithm and uploading the searchable ciphertext to a server (B), wherein the step of generating a searchable ciphertext corresponding to the keyword W using an encryption algorithm comprises:

determining whether the keyword W is encrypted for the first time, and if the keyword W is encrypted for the first time, applying a first encryption algorithm, and if the keyword W is not encrypted for the first time, applying a second encryption algorithm different from the first encryption algorithm, wherein the first encryption algorithm comprises a pairing operation, and the searchable ciphertext generated using the second encryption algorithm is relevant to the searchable ciphertext generated when the keyword W was encrypted last time through an implication relation (E);

Step 400: by a receiving party (C), inputting the keyword W and the private key SK, and outputting a search trapdoor $T_W$ and submitting the search trapdoor $T_W$ to the server (B); and Step 500: by the server (B), inputting the search trapdoor $T_W$, the public parameter PK, and a searchable ciphertext set composed of plural searchable ciphertexts, executing a search algorithm, performing a pairing operation to find out the searchable ciphertext corresponding to the keyword W generated using the first encryption algorithm, and finding out the searchable ciphertext corresponding to the keyword W generated using the second encryption algorithm through the implication relation (E);

wherein Step 300 further comprises:

Step 310: by the transmitting party (A), inputting a keyword W, the public parameter PK, and the private part Pri of the structure, checking whether (W, Pt) exists in the private part Pri of the structure according to the keyword W, and if (W, Pt) exists in the private part Pri of the structure, determining that the keyword W is not encrypted for the first time, and proceeding with Step 330, and if (W, Pt) does not exist in the private part Pri of the structure, determining that the keyword W is encrypted for the first time, and proceeding with Step 320, Step 320: applying the first encryption algorithm, which comprises: running a random-number-generating algorithm to obtain a random number R, then making Pt=R, generating a private status Pt of the keyword W, inserting (W, Pt) into the private part Pri of the structure, running the first cryptographic hash function $H_1$, performing exponentiation, performing pairing, performing inversion, performing a multiply operation, and running the second cryptographic hash function $H_2$, and outputting the searchable ciphertext $$C=(H_2(\hat{e}(P^u, H_1(W))), \hat{e}(P^u, H_1(W))^{-1} \cdot Pt),$$

Step 330: applying the second encryption algorithm, which comprises: running a random-number-generating algorithm to obtain a random number R, running the second cryptographic hash function $H_2$, performing inversion, and performing a multiply operation, and outputting the searchable ciphertext C=$H_2$(Pt), $Pt^{-1} \cdot R$), then making Pt=R, and updating the private status Pt of the keyword in the private part Pri of the structure.

2. The method of claim 1, wherein the second encryption algorithm does not involve pairing and a second computational load of the second encryption algorithm is smaller than a first computational load of the first encryption algorithm.

3. The method of claim 2, wherein the public parameter PK=(q, G, $G_1$, g, ê, P, $H_1$, $H_2$), the private key SK=α, and the public key P=$g^\alpha$;

wherein q is a prime number, G and $G_1$ are two multiplicative groups with a prime order q, g is a generator of Group G, ê: G×G→$G_1$ is a pairing that is calculable, bilinear, and non-degenerate, and $H_1$ and $H_2$ are two cryptographic hash functions, being a first cryptographic hash function $H_1$:{0,1}*→G and a second cryptographic hash function $H_2$: $G_1$→{0,1}$^{log\ q}$, respectively.

4. The method of claim 2, wherein Step 200 further comprises:

running a random-number-generating algorithm to obtain a random number u, performing exponentiation, initializing the structure and outputting the public part Pub=$g^u$ of the structure and the private part Pri=(u) of the structure;

wherein the private part Pri of the structure is a variable length list in the form of (u, {(W, Pt)|Pt∈$G_1$}), and is initialized into 0), uploading the public part Pub of the structure to the server (B).

5. The method of claim 2, wherein the search trapdoor $T_w$=$H_1$(W)$^\alpha$.

6. The method of claim 2, wherein Step 500 further comprises:

Step 510: by the server (B), inputting the search trapdoor $T_w$, the public parameter PK, the searchable ciphertext set, and the public part Pub of the structure, performing pairing calculation Pt'=ê(Pub, $T_w$), running the second cryptographic hash function $H_2$, and generating a first part ℂ[i, 1]=$H_2$(Pt') of the searchable ciphertext, Step 520: by the server (B), performing matching search on the first part ℂ[0,1] of the searchable ciphertext in the searchable ciphertext set, and determining whether any matching searchable ciphertext is found, and if a matching searchable ciphertext is found, proceeding with Step 530, and if no matching searchable ciphertext is found, the method proceeding with Step 540, Step 530: identifying a second part ℂ[i, 2] of the matching searchable ciphertext in Step 520, calculating Pt'=Pt'·ℂ[i, 2], then running the second cryptographic hash function $H_2$, generating the first part ℂ[i, 1]=$H_2$(Pt') of the searchable ciphertext to be searched next time, and proceeding with Step 520, and Step 540: having the server (B) stop searching and output the found searchable ciphertext.

7. The method of claim 1, wherein the public parameter PK=(q, G, $G_1$, g, ê, P, $H_1$, $H_2$), the private key SK=α, and the public key P=$g^\alpha$;

wherein q is a prime number, G and $G_1$ are two multiplicative groups with a prime order q, g is a generator of Group G, ê: G×G→$G_1$ is a pairing that is calculable, bilinear, and non-degenerate, and $H_1$ and $H_2$ are two cryptographic hash functions, being a first cryptographic hash function $H_1$:{0,1}*→G and a second cryptographic hash function $H_2$: $G_1$→{0,1}$^{log\ q}$, respectively.

8. The method of claim 1, wherein Step 200 further comprises:

running a random-number-generating algorithm to obtain a random number u, performing exponentiation, initializing the structure and outputting the public part Pub=$g^u$ of the structure and the private part Pri=(u) of the structure;

wherein the private part Pri of the structure is a variable length list in the form of (u,{(W,Pt)|Pt∈$G_1$}), and is initialized into (u), uploading the public part Pub of the structure to the server (B).

9. The method of claim 1, wherein the search trapdoor $T_w$=$H_1$(W)$^\alpha$.

10. The method of claim 1, wherein Step 500 further comprises:

Step 510: by the server (B), inputting the search trapdoor $T_w$, the public parameter PK, the searchable ciphertext set, and the public part Pub of the structure, performing pairing calculation Pt'=ê(Pub, $T_w$), running the second cryptographic hash function $H_2$, and generating a first part ℂ[i, 1]=$H_2$(Pt') of the searchable ciphertext, Step 520: by the server (B), performing matching search on the first part ℂ[i, 1] of the searchable ciphertext in the searchable ciphertext set, and determining whether any matching searchable ciphertext is found, and if a matching searchable ciphertext is found, proceeding with Step 530, and if no matching searchable ciphertext is found, the method proceeding with Step 540, Step 530: identifying a second part ℂℂ[i, 2] of the matching searchable ciphertext in Step 520, calculating Pt'=Pt'·ℂ[i, 2], then running the second cryptographic hash function $H_2$, generating the first part ℂ[i, 1]=$H_2$(Pt') of the searchable ciphertext to be searched next time, and proceeding with Step 520, and Step 540: by the server (B), stopping searching and outputting the found searchable ciphertext.

11. A searchable public-key encryption system, comprising:
a key distribution center (D);
a server (B);
a receiving party (C) with a receiver;
a transmitting party (A) with a transmitter;
the key distribution center (D) configured to construct pairing according to a predetermined security parameter, and output a public parameter PK and a private key SK;
the transmitting party (A) configured to initialize a searchable ciphertext structure according to the public parameter PK, and output a public part Pub of the structure and a private part Pri of the structure;
the transmitting party (A) configured to input a keyword W, the public parameter PK, and the private part Pri, generate a searchable ciphertext corresponding to the keyword W using an encryption algorithm and upload the searchable ciphertext to the server (B), wherein generation of the searchable ciphertext corresponding to the keyword W using the encryption algorithm comprises:
determining whether the keyword W is encrypted for the first time, and if the keyword W is encrypted for the first time, applying a first encryption algorithm, and if the keyword W is not encrypted for the first time, applying a second encryption algorithm different from the first encryption algorithm, wherein the first encryption algorithm comprises a pairing operation, and the searchable ciphertext generated using the second encryption algorithm is relevant to the searchable ciphertext generated when the keyword W was encrypted last time through an implication relation (E),
inputting, by the transmitting party (A), a keyword W, the public parameter PK, and the private part Pri of the structure, check whether (W, Pt) exists in the private part Pri of the structure according to the keyword W, and if (W, Pt) exists in the private part Pri of the structure, determine that the keyword W is not encrypted for the first time, and if (W, Pt) does not exist in the private part Pri of the structure, determine that the keyword W is encrypted for the first time,
applying the first encryption algorithm, which comprises: running a random-number-generating algorithm to obtain a random number R, then making Pt=R, generating a private status Pt of the keyword W, inserting (W, Pt) into the private part Pri of the structure, running the first cryptographic hash function $H_1$, performing exponentiation, performing pairing, performing inversion, performing a multiply operation, and running the second cryptographic hash function $H_2$, and outputting the searchable ciphertext $$C=(H_2(\hat{e}(P^u,H_1(W))),\hat{e}(P^u,H_1(W))^{-1}\cdot Pt),$$

applying the second encryption algorithm, which comprises: running a random-number-generating algorithm to obtain a random number R, running the second cryptographic hash function $H_2$, performing inversion, and performing a multiply operation, and outputting the searchable ciphertext $C=(H_2(Pt), Pt^{-1}\cdot R)$, then making Pt=R, and updating the private status Pt of the keyword in the private part Pri of the structure,
inputting, by the receiving party (C), the keyword W and the private key SK, outputting a search trapdoor $T_W$ and submitting the search trapdoor $T_W$ to the server (B); and the server (B) configured to input the search trapdoor $T_W$, the public parameter PK, and a searchable ciphertext set composed of plural searchable ciphertexts, execute a search algorithm, perform a pairing operation to find out the searchable ciphertext corresponding to the keyword W generated using the first encryption algorithm, and find out the searchable ciphertext corresponding to the keyword W generated using the second encryption algorithm through the implication relation (E).

12. The system of claim 11, wherein the second encryption algorithm does not involve pairing and a second computational load of the second encryption algorithm is smaller than a first computational load of the first encryption algorithm.

13. A server (B), comprising:
a hardware processor coupled to a memory;
the server (B) configured to construct pairing according to a predetermined security parameter, output a public parameter PK and a private key SK, and then send the public parameter PK to a transmitting party (A) with a transmitter, while sending the private key to a receiving party (C) with a receiver;
the transmitting party (A) configured to initialize a searchable ciphertext structure according to the public parameter PK, and output a public part Pub of the structure and a private part Pri of the structure;
the transmitting party (A) configured to input a keyword W, the public parameter PK, and the private part Pri, generate a searchable ciphertext corresponding to the keyword W using an encryption algorithm and upload the searchable ciphertext to the server (B), wherein generation of the searchable ciphertext corresponding to the keyword W using the encryption algorithm involves:
determining whether the keyword W is encrypted for the first time, and if the keyword W is encrypted for the first time, applying a first encryption algorithm, or if the keyword W is not encrypted for the first time, applying a second encryption algorithm different from the first encryption algorithm,
wherein the first encryption algorithm comprises a pairing operation, and the searchable ciphertext generated using the second encryption algorithm is relevant to the searchable ciphertext generated when the keyword W was encrypted last time through an implication relation (E),
inputting, by the transmitting party (A), a keyword W, the public parameter PK, and the private part Pri of the structure, check whether (W, Pt) exists in the private part Pri of the structure according to the keyword W, and if (W, Pt) exists in the private part Pri of the structure, determine that the keyword W is not encrypted for the first time, and if (W, Pt) does not exist in the private part Pri of the structure, determine that the keyword W is encrypted for the first time,
applying the first encryption algorithm, which comprises: running a random-number-generating algorithm to obtain a random number R, then making Pt=R, generating a private status Pt of the keyword W, inserting (W, Pt) into the private part Pri of the structure, running the first cryptographic hash function $H_1$, performing exponentiation, performing pairing, performing inversion, performing a multiply operation, and running the second cryptographic hash function $H_2$, and outputting the searchable ciphertext $C = H_2(\hat{e}(P^\mu, H_1(W))), \hat{e}(P^\mu, H_1(W))^{-1} \cdot Pt)$, applying the second encryption algorithm, which comprises: running a random-number-generating algorithm to obtain a random number R, running the second cryptographic hash function $H_2$, performing inversion, and performing a multiply operation, and outputting the searchable ciphertext $C = (H_2(Pt), Pt^{-1} \cdot R)$, then making Pt=R, and updating the private status Pt of the keyword in the private part Pri of the structure;

the receiving party (C) configured to input the keyword W and the private key SK, output a search trapdoor $T_W$ and submit the search trapdoor $T_W$ to the server (B); and the server (B) configured to input the search trapdoor $T_W$, the public parameter PK, and a searchable ciphertext set composed of plural searchable ciphertexts, execute a search algorithm, perform a pairing operation to find out the searchable ciphertext corresponding to the keyword W generated using the first encryption algorithm, and find out the searchable ciphertext corresponding to the keyword W generated using the second encryption algorithm through the implication relation (E).

* * * * *